United States Patent [19]
Hetz et al.

[11] Patent Number: 5,835,583
[45] Date of Patent: Nov. 10, 1998

[54] MEDIATED AIN CONTROL OF SHORT CODE ACCESS TO INFORMATION SERVICE PROVIDERS

[75] Inventors: Harry A. Hetz, Silver Spring, Md.; Robert D. Farris, Sterling, Va.

[73] Assignee: Bell Atlantic Network Services, Inc., Arlington, Va.

[21] Appl. No.: 539,453

[22] Filed: Oct. 5, 1995

[51] Int. Cl.⁶ .............................. H04M 1/64; H04M 7/00
[52] U.S. Cl. .............................. 379/220; 379/67; 379/88; 379/89; 379/219; 379/220; 379/229; 379/230
[58] Field of Search .................... 379/67, 88, 89, 379/219, 220, 229, 230

[56] References Cited

U.S. PATENT DOCUMENTS

| | | | |
|---|---|---|---|
| 4,191,860 | 3/1980 | Weber | 379/115 |
| 4,611,094 | 9/1986 | Asmuth | 379/201 |
| 4,611,096 | 9/1986 | Asmuth | 379/207 |
| 4,737,983 | 4/1988 | Frauenthal et al. | 379/221 |
| 4,757,267 | 7/1988 | Riskin | 379/113 |
| 4,788,718 | 11/1988 | McNabb et al. | 379/113 |
| 4,817,129 | 3/1989 | Riskin | 379/88 |
| 4,827,500 | 5/1989 | Binkerd et al. | 379/88 |
| 4,924,510 | 5/1990 | Le | 379/221 |
| 4,987,587 | 1/1991 | Jolissaint | 379/94 |
| 5,136,636 | 8/1992 | Wegrzynowicz | 379/207 |
| 5,193,110 | 3/1993 | Jones | 379/94 |
| 5,247,571 | 9/1993 | Kay et al. | 379/207 |
| 5,259,026 | 11/1993 | Johnson | 379/207 |
| 5,311,575 | 5/1994 | Oh | 379/88 |
| 5,353,331 | 10/1994 | Emery et al. | 379/58 |
| 5,386,467 | 1/1995 | Ahmad | 379/201 |
| 5,418,844 | 5/1995 | Morrisey et al. | 379/207 |
| 5,430,719 | 7/1995 | Weisser, Jr. | 370/58.2 |
| 5,438,568 | 8/1995 | Weisser, Jr. | 370/60 |
| 5,448,632 | 9/1995 | Iyob et al. | 379/201 |
| 5,452,350 | 9/1995 | Reynolds ET AL. | 379/220 |
| 5,473,679 | 12/1995 | La Porta et al. | 379/201 |
| 5,481,603 | 1/1996 | Gutierrez et al. | 379/221 |
| 5,566,235 | 10/1996 | Hetz | 379/201 |
| 5,572,583 | 11/1996 | Wheeler, Jr. et al. | 379/207 |
| 5,583,920 | 12/1996 | Wheeler, Jr. | 379/88 |

OTHER PUBLICATIONS

Van Hal, et al., "Service Script Interpreter, an Advanced Intelligent Network Platform", *Ericsson Review*, No. 1, 1990, pp. 12–22.

*Primary Examiner*—Krista Zele
*Assistant Examiner*—Allan Hoosain
*Attorney, Agent, or Firm*—McDermott, Will & Emery

[57] ABSTRACT

In an Advanced Intelligent Network, a central mediation point stores call processing records for controlling call routing and other call processing functions. To provide short code access to information service providers, each information service provider will operate an independent database which stores additional call processing records. When an established subscriber dials the short code, e.g. an N11 code, the mediation point identifies the information provider that the subscriber has previously selected from the subscriber's call processing record stored in the mediation point. The mediation point communicates with that service provider's database to obtain call processing information. The mediation point validates the call processing information for compatibility with network operations. The mediation point forwards validated call processing information to a node of the network to process the call in accord with the information from the provider's database. If the caller has not pre-selected one of the provider's or the caller dials one alternate short code, the network will prompt the caller for a selection, and then obtain the necessary call processing information from the database of the selected provider.

38 Claims, 2 Drawing Sheets

MEDIATED AIN CONTROL OF SHORT CODE ACCESS TO INFORMATION SERVICE PROVIDERS

CROSS-REFERENCE TO RELATED APPLICATION

This application is related to concurrently filed U.S. patent application Ser. No. 08/539,639, filed on Oct. 5, 1995 entitled CUSTOMER CONTROLLED SERVICE MEDIATION MANAGEMENT which issued Oct. 15, 1996 as U.S. Pat. No. 5,566,235, the disclosure of which is entirely incorporated herein by reference.

1. Technical Field

The present invent on relates to an Advanced Intelligent Network, which provides automatic routing of calls to customer selected information sources using a dedicated short access number and enabling third party operators of the information sources to utilize a short code trigger point in call processing to initiate query and response procedures with their own databases on an equal access basis to control routing to their respective sources.

2. Acronyms

The written description uses a large number of acronyms to refer to various services and system components. Although generally known, use of several of these acronyms is not strictly standardized in the art. For purposes of this discussion, acronyms therefore will be defined as follows:
Action Control Point (ACP)
Advanced Intelligent Network (AIN)
Automatic Number Identification (ANI)
Call Processing Record (CPR)
Central Office (CO)
Common Channel Inter-Office Signalling (CCIS)
Database (DB)
Data and Reporting System (DRS)
Dual Tone Multifrequency (DTMF)
Information Service Provider (ISP)
Integrated Service Control Point (ISCP)
Intelligent Peripheral (IP)
Multi-Services Application Platform (MSAP)
Office Action Control Point (OSO-ACP)
Personal Communications Service (PCS)
Personal Identification Number (PIN)
Plain Old Telephone Service (POTS)
Point In Call (PIC)
Point of Presence (POP)
Private Branch Exchange (PBX)
Service Control Point (SCP)
Service Creation Environment (SCE)
Service Management System (SMS)
Service Switching Point (SSP)
Signaling Point (SP)
Signaling System 7 (SS7)
Signaling Transfer Point (STP)
Telephone Company (TELCO)
Transaction Capabilities Applications Protocol (TCAP)
Voice Response Unit (VRU)

Background Art

There is an increasing demand to obtain a wide variety of information over telephone lines. Many different companies provide information services in a wide range of formats including voice messages, computerized data bases, facsimile data, etc. The variety of information these services provide is virtually limitless. Examples include news, weather and traffic information, sports information and stock ticker data. Information service providers also may take orders for products and services, or offer other kinds of interactive functions. Typically, each Information Service Provider (ISP) will connect the equipment to provide the information in facsimile, data or voice form to one or more telephone lines. In the existing telephone network, each line connected information source has a telephone number. Typically, to access that source, a caller dials the complete telephone number for that source. To access a different source, the caller must dial a different number.

Alternatively, one information service provider might operate more than one source, for example a newspaper has a headline news service, a sports section service, a business service, etc. If such a provider does not want to require a separate number for each service, the provider could use a PBX or Centrex system with an automated attendant type feature. Typically, the user would call one published number for the information service provider. The automated attendant system answers the call, and the caller dials in a selection identifying the provider's one service the current call should connect to. The PBX or Centrex switch then connects the call to the appropriate information source. To reach a different information service provider, however, the caller must still know and use a different telephone number.

In the existing systems, whether one number identifies each actual source or identifies a collection of information services of one information provider, the numbers are all complete telephone numbers. If the call to the service provider is a local call, dialing requires seven digits. If the call is a long distance call, or the service uses an 800 or 900 type number, the telephone number dialed is ten digits. Remembering and using a collection of seven and ten digit numbers to access all information sources a telephone subscriber might be interested in is complicated and may actually discourage customers from using more than one or two different information service providers on a regular basis.

Clearly there is a need for a simpler access procedure in order to encourage increased public use of information services provided over the telephone network.

Recently, it has been proposed to use a three-digit access approach. Each information service provider in a particular service area would be assigned a three digit number, and the telephone network would route all calls to the service provider whenever a caller initially dialed those three digits. The three digit numbers would be "N11" type special dedicated numbers easily recognized by the telephone system, similar to the 911 number used for emergency calls and the 411 number used for directory assistance. The number of dedicated three digit numbers available, however, is quite limited. In fact there are currently only four such numbers, 211, 311, 511 and 711 not already in use. The available N11 type three digit numbers therefore constitute an extremely scarce resource. The proposed three digit access system would use up all four of the available N11 numbers. Another drawback of the proposed three digit access system is that the caller could access only four information service providers using the three digit numbers. One number would be dedicated to each information service provider.

Thus a need exists for a system using a short access number or code to access a large number of information providers. To the extent that the system uses special dedicated numbers, such as N11 numbers, the system must use as few as possible of such dedicated numbers.

In recent years, a number of new service features have been provided by an enhanced telephone network, sometimes referred to as an Advanced Intelligent Network (AIN).

In an AIN type system, local and/or toll offices of the public telephone network having Service Switching Point (SSP) capabilities detect one of a number of call processing events identified as AIN "triggers". For ordinary telephone service calls, there would be no event to trigger AIN processing; and the local and toll office switches would function normally and process such calls without referring to the central database for instructions. An SSP type office which detects a trigger will suspend call processing, compile a call data message and forward that message via a common channel interoffice signalling (CCIS) link to an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the SSP office of the network via CCIS link. The network offices then use the call control message to complete the particular call.

An AIN type network for providing short code access to information providers was disclosed and described in detail in commonly assigned U.S. Pat. No. 5,418,844 to Morrisey et al., the disclosure of which is entirely incorporated herein by reference. In that network, a central office switch having SSP capabilities detects dialing off a short code, such as N11, as an AIN trigger. The SSP queries the ISCP for information as to how to route the particular call. For the service of routing to an information provider, the ISCP would return information instructing the SSP switching office to process the call in accord with information stored in a profile of the caller established in the ISCP database.

The Morrisey et al. system can use a single N11 number for all calls, or a first code number for preprogrammed call processing and a second number for casual access (e.g. 211 and 511). The system can route an information service call based at least in part on preprogrammed selection data for the caller stored in a central database, or can prompt a casual caller for various inputs to determine which service provider the caller currently wants to access. Because of the use of a programmable central database, the system can provide customized routing and call processing procedures for different customers and for accessing a virtually unlimited number of different providers' services. The system can also provide access authorization procedures as defined by the customer or as defined by the information service provider.

AIN type processing in such a system, however, is controlled by the ISCP, which typically is operated by the local exchange carrier telephone company (TELCO). Information service providers have been reluctant to accept the Morrisey et al. type routing service because the TELCO must maintain the database in the ISCP. In at least some markets, the TELCO may offer one or more information services, and competing providers feel that maintenance of the routing control database by the TELCO places the independent providers at a competitive disadvantage. The TELCO effectively has access to the N11 trigger based call processing control functionality, but other providers do not.

From the above discussion, it becomes clear that a need still exists to provide N11 or other short code routing to servers or service bureaus operated by information providers in a manner which offers the providers equal access to the AIN functionality. Some AIN services have involved accessing databases other than the ISCP of the local TELCO, but as discussed below, there are deficiencies in these call processing functionalities which prevent use thereof to adequately address the needs of short code based routing to information providers service bureaus.

For example, 800 number call processing utilizes a central 800 database in a Service Control Point (SCP), to control switching operations through multiple end offices. Examples of 800 number call processing routines are disclosed in U.S. Pat. No. 4,191,860 to Weber, U.S. Pat. No. 4,611,094 to Asmuth et al. and U.S. Pat. No. 4,611,096 to Asmuth et al.

Such 800 number services of the type discussed above are offered by multiple carriers, including local exchange carriers and interexchange carriers. When the NXX digits of the dialed 800 number identify an 800 number service offered by the local exchange carrier, the local exchange carriers' switch queries an SCP or ISCP operated by the local exchange carrier for the necessary call processing information. However, if the NXX digits of the dialed 800 number identify an 800 number service offered by a different carrier, the call goes to that carrier's point of presence (POP), and the query goes from the POP to that carrier's SCP. In each case, the query always is forwarded to the one database set up to always control processing of the one customer's 800 number calls. The existing call processing systems and methodologies have not provided alternate parties with equal access to the trigger functionality of the AIN, to offer their own range of services off of the various types of triggers that the local exchange carrier's intelligent network can recognize. If a limited solution similar to 800 number processing were applied to N11 routing of calls to information providers, only one provider operating some form of N11 responsive database would control all routing of N11 calls. There would still not be true equal access to the N11 trigger.

Some patents have suggested 800 number processing involving multiple databases, and several examples thereof are discussed below. These call processing systems still do not present an effective mechanism to offer multiple providers full equal access to the N11 or other short code trigger responsive call processing control functionality.

U.S. Pat. No. 5,136,636 to Wegrzynowicz discloses an enhanced 800 number system for selecting a local dealer from among a group of dealers for completion of each 800 number. When a caller dials an 800 number, the call is first connected to an originating screening office action control point (OSO-ACP) of the toll switching system. The OSO-ACP launches a first query to an INWATS (800 number) database. The INWATS database translates the data in the initial query into an initial response message which includes a special routing number, i.e. including a three digit prefix such as 195, which can not be dialed as the first three digits of a valid telephone number. The OSO-ACP recognizes from the prefix digits that an additional query is necessary and launches a second query directed to one of a plurality of direct services dialing databases. The direct services dialing database which receives the second query uses the routing number to access a segment of data within the database to translate the caller's NPA plus office code into the plain old telephone service (POTS) telephone number of a nearby dealer. The direct services dialing database transmits the POTS telephone number back to the OSO-ACP, and the OSO-ACP uses that number to complete the call.

U.S. Pat. No. 4,827,500 to Binkerd et al. discloses a system for providing a call distribution feature on 800 calls in response to either DTMF or speech input commands from the caller, using data from a basic 800 number database and an Advanced 800 number database. When a caller dials an 800 number, the call is routed to an originating screening office which transmits a first query to the 800 number database. If the file in the 800 number database indicates that Advanced 800 number processing in response to DTMF or speech inputs is necessary, the 800 number database returns a message to the originating screening office which includes a destination number corresponding to an Action Control Point (ACP) which is capable of processing the Advanced 800 number calls. The originating screening office switch uses the received number to route the call to the ACP, and in response, the ACP initiates a query message to the Advanced 800 number database asking how to route the present call. The Advanced 800 number database sends a message to the ACP instructing it to route the call to an announcement point, which has a voice processing unit associated therewith. The Advanced 800 number database also sends a message to the announcement point instructing it to play a specific message from the voice processing unit to the present caller and receive tone or speech command signals back from the caller. The voice processing unit derives data from the received signals, and the announcement point forwards that data to the Advanced 800 number database. The database uses the received data, together with the dialed number and the number of the caller, to derive a plain old telephone service type destination number from stored data. The Advanced 800 number database forwards the derived destination number back to the ACP. The ACP drops the connection to the announcement point and requests a connection through the public switched telephone network to the station identified by the destination number.

U.S. Pat. No. 4,924,510 to Le teaches provision of a dynamic table of the most frequently called Advanced 800 numbers and the corresponding routing data in each toll switching system. When a toll switching system receives an 800 call, the table is examined to see if the Advanced 800 service assessing data is stored. If so, the toll switching system accesses the Advanced 800 database directly without first accessing a Basic 800 database. If the data for accessing the Advanced 800 service is not stored in the toll switching system's table, the call is processed in a manner similar to that disclosed in the above discussed Binkerd et al. Patent. The toll switching system updates the table if the call was directed to an Advanced 800 customer.

U.S. Pat. No. 4,987,587 to Jolissaint pertains to method and apparatus for providing an 800 number customer an on-site customer-made determination of what further action should be taken in response to a caller dialing the customer's 800 number. The Jolissaint system includes apparatus for receiving from an 800 number network provider's Host Processor information expressive of an occurrence of a caller having dialed a customer's 800 telephone number. The information received by the customer's Host processor includes the dialed number and an identification of the caller's billing telephone number. The system includes an apparatus for determining at a customer's Host processor an action to be taken in response to the dialing of the 800 number. The customer's Host processor may deny or accept the call or may route the call to an alternate destination, for example based on the caller's identity. The system further includes an apparatus for transmitting information as to what action the customer's host processor determined should be taken back to the network provider's Host Processor. The network provider's Host Processor then disposes of the call in the manner specified by the information from the customer's Host Processor. For example, if the call is to be accepted, the network provider's Host Processor forwards the call to the caller's local Host Processor.

In each of the above discussed 800 number systems, one carrier or service provider controls routing of all calls in response to a particular trigger, e.g. dialing of a particular 800 number. There is no provision to allow multiple called parties to independently control routing to their stations or services bureaus in response to a single trigger, such as dialing of a short code or N11 number. To the extent that the Morrisey system allowed routing to multiple providers based on selections by different customers, the control data was stored in a single database controlled by the TELCO.

Some patents have suggested access to other database systems and/or ISCPs of other carriers, but these proposals have still provided at most a limited form of access to the AIN trigger functionality and have not permitted a subscriber to utilize multiple provider's services effectively. Two examples are discussed below.

U.S. Pat. No. 5,311,575 to Friedes et al. teaches providing a customer database, essentially as a customer controlled extension of a network database maintained by the network service carrier. During call processing, a switch (ACP) of the public network queries the carrier's database, and if necessary, the carrier's database obtains additional information from the customer's database. Customers having PBX type on-premises equipment communicate with the subscriber database via a separate status data network.

Commonly assigned U.S. Pat. No. 5,353,331 to Emery et al. discloses an AIN based system for offering personal communications service (PCS). As the subscriber roams, the wireless handset periodically registers its location through a mobile switch or through a home land line base station, and this information is recorded in the ISCP for use in routing subsequent calls to the handset at its current location. Of particular note here, in a nationwide implementation of such a system, with multiple ISCP databases, the ISCP in a given region serves as a mediation point to obtain necessary information from switches and ISCPs in other regions. When a subscriber registers through a remote region, either automatically or by initiating an outgoing call, the ISCP in that region executes a validation routine with the ISCP in the subscriber's home region, to confirm that the subscriber is valid and obtain data relating to that subscriber's services. Subsequently, when the home region is processing a call to the subscriber's number, the ISCP in that region communicates with the ISCP in the remote region to obtain information needed to route the call to the subscriber's current location. The switching systems in a particular region communicate with only the ISCP in the particular region. One function of the mediating ISCP is to process data from a distant ISCP to insure compatibility thereof with the switching systems in the particular region. The mediation function of the ISCP in the Emery et al. system, however, is still limited to only certain very specific trigger occurrences and provision of a single unified PCS service, albeit across geographic boundaries. The mediation occurs only in response to a need for validation of a roaming subscriber or in response to an incoming call.

U.S. Pat. No. 5,430,719 to Weisser, Jr. discloses a service control point (SCP) for use in an advanced intelligent network (AIN), wherein the service control point mediates services offered by a number of different providers. The mediated service control point runs both local exchange carrier applications and service provider applications programs on the SCP computer. An interpreter within the SCP mediates network control by the various service provider applications. This system does provide some additional level of access by providers to the network control functionality, but that access still is controlled by the TELCO operating the SCP since all relevant applications and database information must be maintained within the one SCP. Also, each combination of one directory number and one trigger can invoke one and only one service application.

From the above discussion, it becomes clear that the existing systems and call processing functionalities provide alternate independent service providers at most a limited intelligent routing in response to only very specific limited triggering type events. Also, only the Morrisey et al. system adapts AIN type processing to short code routing of calls to service bureaus operated by information providers, but that system maintains an excessive amount of control over call processing with the TELCO. The information service providers cannot independently control routing of calls to their service bureaus. Also, the various information service providers cannot use the same trigger to provide one subscriber a plurality of independent services under different conditions.

Disclosure of the Invention

The present invention overcomes the above noted problems by providing systems and call processing methodologies to access control data of multiple information service providers in response to a short dialing code trigger, based on subscriptions and/or in response to caller inputs if the short code caller has no established subscriptions or dials an alternate short code. The service providers can populate data in their respective databases to offer totally separate independent services customized for their subscribers' preferences.

In accord with one aspect of the present invention, a central office switching system detects dialing of a short code number prior to dialing of any other digits at the start of a call. In response, the central office switching system sends a first query containing information relating to the call through the interoffice signaling network to a mediation point. In the preferred embodiment, the mediation point is an Integrated Service Control Point (ISCP). Based on predetermined criteria, the mediation point selects one of a plurality of information service providers capable of providing an independent information service to the calling communication station.

The selection criteria can relate to a number of different conditions selected by the individual subscriber alone or in combination with the service provider(s). For example, the subscriber may establish a selection of only one provider that the subscriber prefers to deal with and to whose services he has already subscribed. As another example, the subscriber may select a plurality of service providers, and data stored in the mediation point specifies different conditions (e.g. times) under which calls should go to each of the selected providers' systems.

When the mediation point selects one of a plurality of information service providers, the mediation point sends a second query containing at least some of the information relating to the call to a database of the selected information service provider. Data within the database of the selected information service provider is accessed in response to the second query to obtain a call processing instruction. The database sends a first response containing the call processing instruction to the mediation point. Preferably, the communications between the mediation point and the databases use the interoffice signaling network of the AIN.

The mediation point processes the first response to validate the call processing instruction. The mediation point then sends a second response containing the validated call processing instruction via the interoffice signaling network to a node of the network that is processing the call, e.g. to the switching office or to an intelligent peripheral. The node processes the call in accord with the validated call processing instruction. In a typical case, the instruction will specify a telephone number of a piece of equipment operated by the provider that offers a particular service, and the switching office will route the call using that telephone number. Under other conditions, the instruction from the database may request that the network node provide an announcement and collect digits, e.g. to execute a security routine before actual routing to the provider's system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

In accord with the present invention, occurrence of a short code trigger, e.g. dialing of an N11 code, causes a query to a mediation point, typically operated by the local TELCO. Each of a plurality of information service providers operates a database storing call processing information to control provision of the respective provider's information services, independent of any services offered by other providers or the TELCO. The mediation point identifies the provider having control of the call under the current set of conditions. The conditions or criteria, for example, may relate to time of day. The mediation point then obtains call processing information from a database operated by the provider having control of the call. The mediation point may process the information to insure compatibility with the switch or other network equipment handling the call, and the mediation point forwards the information to the appropriate network element(s) to continue processing of the call.

Figure 1:
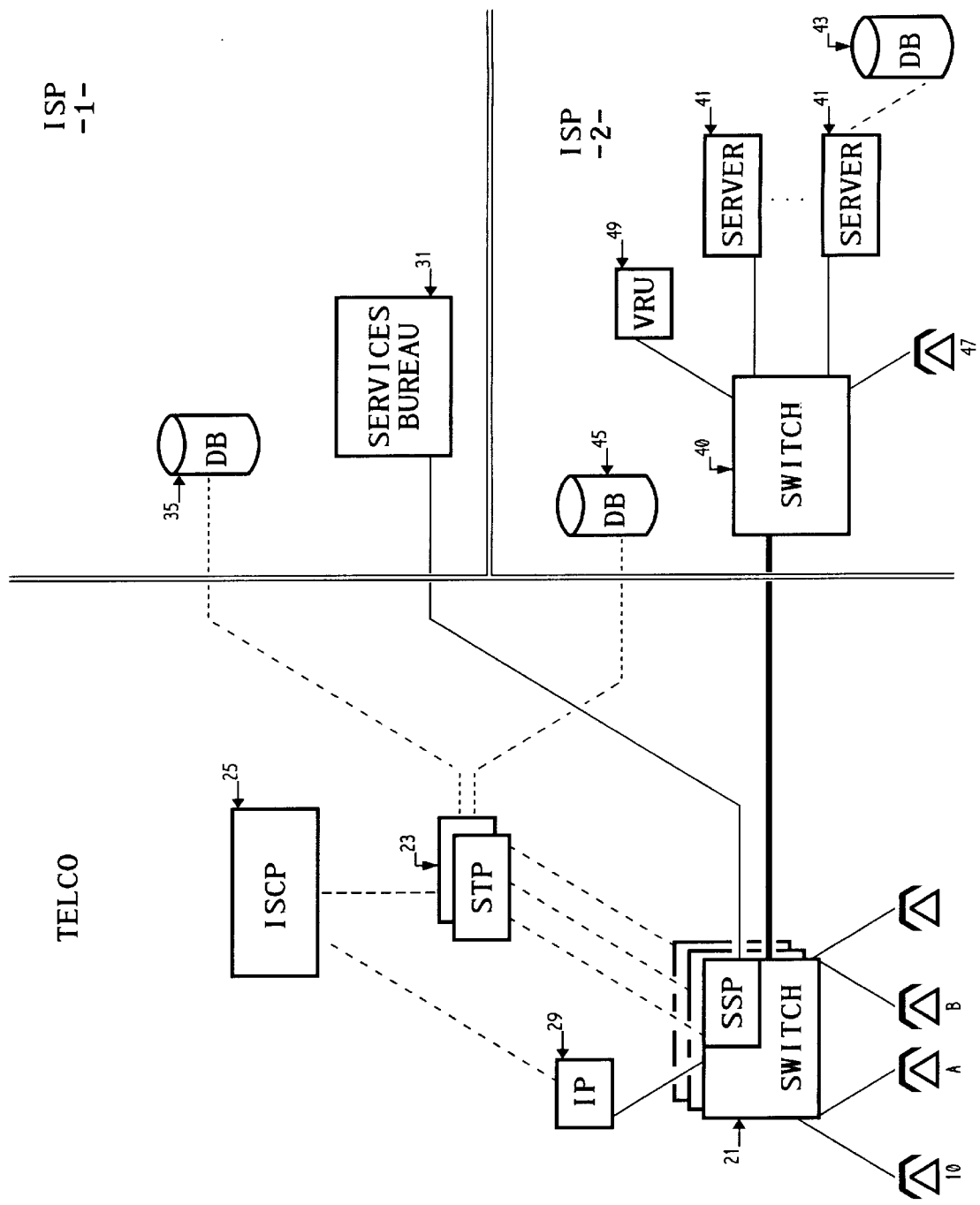
FIG. 1 is a simplified schematic block diagram of an Advanced Intelligent Network utilizing the call processing functionality of the present invention.

FIG. 1 provides a simplified block diagram of a public telephone type network implementing the present invention, although other types of network may utilize the concepts of the invention to provide short code dial up access to information service providers. For ease of explanation, the succeeding discussion of the invention concentrates on implementation thereof in a telephone network of the type shown in FIG. 1.

Referring to FIG. 1 there is shown a simplified block diagram of a switched traffic network and the common channel signaling network used to control the signaling for the switched traffic network. In FIG. 1, the TELCO network (operated by a combination of local carriers and interexchange carriers) includes a number of end office switching systems providing connections to and from local communication lines coupled to end users telephone station sets 10. The TELCO network typically will also include one or more tandem switching offices (not shown) providing trunk connections between end offices. As such, the network consists of local communication links and a series of switching offices interconnected by voice grade trunks.

Although shown as telephones in FIG. 1, the terminal devices 10 can comprise any communication device compatible with the local communication line. Where the line is a standard voice grade telephone line, for example, the terminals could include facsimile devices, modems etc. Also, FIG. 1 shows connections to the station via lines, and typically these links are telephone lines. It will be apparent to those skilled in the art that these links may be other types of communication links, such as broadband lines, wireless links, etc.

The lines and trunks through the switching offices 21 carry the communication traffic of the TELCO network. The TELCO network, however, also includes a common channel interoffice signaling (CCIS) network carrying a variety of signaling messages, principally relating to control of processing of calls through the traffic portion of the network. The CCIS network includes packet data links (shown as dotted lines) connected to appropriately equipped central office switching systems 21 and a plurality of packet switches, termed Signaling Transfer Points (STPs) 23. To provide redundancy and thus a high degree of reliability, the STPs 23 typically are implemented as mated pairs of STPs. The CCIS network of the TELCO operates in accord with an accepted signaling protocol standard, preferably Signaling System 7 (SS7).

In the preferred embodiment shown in FIG. 1, each switching office has at least minimal SS7 signaling capability, which is conventionally referred to as a signaling point (SP) in reference to the SS7 network. Preferably each switching office is programmed to recognize identified events or points in call (PICs). In response to a PIC, switching office 21 triggers a query through the CCIS signaling network to an Integrated Service Control Point (ISCP) 25 for instructions relating to AIN type services. Switching offices such as switch 21 having AIN trigger and query capability are referred to as Service Switching Points (SSPs).

The above described data signalling network between the SSP type central offices and the ISCP is preferred, but other signalling networks could be used. For example, instead of the packet switched type links through the STP's, a number of central office switches, an ISCP and any other signaling nodes could be linked for data communication by a token ring network. Also, the SSP capability may not always be available at the local office level, and several other implementations might be used to provide the requisite SSP capability. For example, none of the end office switches may have SSP functionality. Instead, each end office would connect through a trunk to a tandem office which has the SSP capability. The SSP tandem then communicates with the ISCP, as in the implementation described above, but in this case via an SS7 type CCIS link. The SSP capable tandem switches are digital switches, such as the 5ESS switch from AT&T; and the non-SSP type end offices might be 1A analog type switches.

In some implementations, providers of information services will operate their own private switches. A group of lines or one or more trunk circuits also connect one or more switching offices to such private switches. In the illustrated example, the switch 21 connects via a multi-line hunt group type group of line circuits (shown as thick solid lines) to switch 40 in the network of information service provider (ISP) 2. Other providers will connect their service bureau equipment to network switches directly through one or more line circuits. Thus, FIG. 1 shows a services bureau 31 of ISP 1 connected by telephone line to switch 21.

The ISPs may operate a variety of different types of systems to provide varied information services. The services bureau, for example, may consist essentially of a bank of tape machines, one of which is activated in response to each incoming call. Such a machine answers a call and plays back one or more prerecorded information messages. The services bureau 31 might also include a database of information (not shown) offered by the ISP 1. If so, this database could be accessible via a modem, or the system could detect DTMF tones and output selected items from the database as synthesized speech (see e.g. U.S. Pat. No. 4,817,129 to Riskin). Also, the services bureau 31 could provide data output in facsimile form or in video form. Alternatively, the services bureau may comprise a multi-service processing unit based system such as disclosed in U.S. Pat. No. 5,193,110 to Jones et al. to provide voice, data and facsimile services.

In a more comprehensive implementation, such as that of the ISP 2 shown in FIG. 1, the ISP provides a number of servers 41 operating behind a telephone switch 40, typically a Private Branch Exchange (PBX). The servers may be similar to the above discussed implementations of the equipment in the services bureau 31, but typically each server 41 implements a single category of information service. For example, one server might provide voice messages relating to newspaper information from a database 43. Another server might provide similar information, but in a facsimile or data format. Another server might offer comprehensive national or international weather service information, in selectable voice, data or image formats or combinations thereof. Still another server might offer access to the Internet (not shown). Other examples include stock quotation, catalog ordering, etc. The switch routes calls relating to a particular category of service to the respective server 41.

The system of ISP 2 may also include one or more user terminal devices 47, which typically comprise a telephone station and/or a computer terminal functioning as an attendant station.

The system of ISP 2 may also include a voice response unit (VRU) 49 to provide a variety of generic voice prompts and announcements and collect dialed digits from callers, as selection inputs for controlling routing of calls through switch 40 to the correct server 41. If the call reaching switch 40 corresponds to a service of a specific one of the servers 41, then the switch 41 routes the call to that server directly. However, If the call reaching switch 40 corresponds to a general number assigned to the ISP 2, then the switch routes the call to the VRU 49. In response to such a call, the VRU 49 plays a greeting message, a menu and a voice message prompting the caller to dial in the digit(s) associated with a menu listing for an information service that the caller desires. The VRU 49 detects dialed digits and instructs the switch 40 to transfer the call to the particular server 41 offering the information service corresponding to the dialed digits.

In accord with the present invention, each of the information service providers (ISPs) also operates a routing control database 35, 45. Each respective provider's database stores call processing records (CPRs) and/or related data to control processing of calls from customers who subscribe to that provider's services through the TELCO network. Each such database connects via an appropriate data link to a mated pair of STPs 23 of the SS7 signaling portion of the TELCO network. Typically, the database will include a computer and/or terminal system (not shown) for setting up, maintaining and modifying customers call processing records in the database 35 or 45.

In accord with the present invention, the ISCP 25 serves two functions. First, the ISCP 25 serves as a standard ISCP offering AIN routing control functionalities to customers of the TELCO, in response to AIN queries in the normal manner. For example, the ISCP 25 includes a database (not shown) containing call processing records (CPRs) for controlling, the TELCO carrier's AIN routing services, such as Area Wide Centrex, Switched Redirect, Area Number Calling, etc. The ISCP 25 may also access a separate database (not shown), e.g. to supplement its routing tables for certain services. In the present system, the second function of the ISCP is to serve as a mediation point.

More specifically, the ISCP 25 mediates queries and responses between the TELCO network components and databases operated by information service providers (ISPs). In the short code or N11 type service, the ISCP 25 effectively mediates the service providers' access to short code or N11 trigger related functionality of the carrier switches.

The ISCP 25 is an integrated system. Among other system components, the ISCP 25 includes a Service Management System (SMS), a Data and Reporting System (DRS) and the actual database referred to as a Service Control Point (SCP). The ISCP also typically includes a terminal subsystem referred to as a Service Creation Environment or SCE for programming the database in the SCP for the services subscribed to by each individual customer. The components of the ISCP are connected by an internal, high-speed data network, such as a token ring network.

The switches 21 typically consist of programmable digital switches with CCIS communications capabilities. One example of such a switch is a 5ESS type switch manufactured by AT&T; but other vendors, such as Northern Telecom and Seimens, manufacture comparable digital switches which could serve as the SSPs and SPs. The SSP type implementation of such switches differs from the SP type implementation of such switches in that the SSP switch includes additional software to recognize the full set of AIN triggers and launch appropriate queries.

The local exchange carrier network may also include one or more intelligent peripherals (IPs) 29. The IP at least provides enhanced announcement and digit collection capabilities and/or speech recognition. The IP connects via an appropriate line circuit to one of the switches 21 of the TELCO network. The IP communicates with the ISCP 25, through a data communication network separate from the telephone company switching offices and associated interoffice signalling network (hereinafter referred to as a 'second signaling network').

Commonly assigned copending U.S. patent application Ser. No. 08/248,980, filed May 24, 1994, entitled "Advanced Intelligent Network with Intelligent Peripherals Interfaced to the Integrated Services Control Point" (now U.S. Pat. No. 5,572,583) provides a more detailed disclosure of an AIN type TELCO network, including the structure of an SSP switches, the structure of an ISCP, the structure of an IP and the structure of the second signaling network; and the disclosure of those structures and operation thereof from that application is incorporated herein in its entirety by reference.

An end office switching system 21 shown in FIG. 1 normally responds to a service request on a local communication line connected thereto, for example an off-hook from station A followed by dialed digit information, to selectively connect the requesting line to another selected local communication line, for example to the line to station B. For normal telephone calls, the calling party dials in a seven digit number or the number 1+a ten digit number to uniquely identify a destination station within North America. Longer numbers are dialed for international calls. The connection can be made locally through only the connected end office switching system but typically will go through a number of switching systems 21.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in-band signalling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the originating end office switching system, suspends the call and sends a message through the CCIS network to the end office switching system serving the destination telephone line. The terminating end office determines whether or not the called line is busy. If the called line is busy, the terminating end office so informs the originating end office via CCIS message, and the originating end office provides a busy signal to the calling station. If the called line is not busy, the terminating end office so informs the originating end central office. The originating office provides ringback to the caller, and the terminating office applies ringing current to the line to the called party. When the telephone station connected to the called line goes off-hook, the terminating switching office informs the originating switching office, and the two offices establish a telephone connection via the trunks and end offices (and/or tandem offices) of the network between the calling and called stations.

For an AIN type service, such as call redirection based on data stored in the ISCP 25, the end offices and/or tandems 21 are SSP capable and detect one of a number of call processing events, each identified as a 'point in call' (PIC), to trigger AIN type processing. Specifically, in response to such a PIC, a switching system 21 suspends call processing, compiles a call data message and forwards that message via common channel interoffice signalling (CCIS) links and one or more STPs 23 to an ISCP 25. If needed, the ISCP 25 can instruct the particular switching office to obtain and forward additional information. Once sufficient information has reached the ISCP 25, the ISCP 25 accesses its stored data tables and or data in external database 27 to translate the received data into a call control message and returns the call control message to the switching office 21 via one or more of the STPs 23 and the appropriate CCIS links. The office 21 uses the call control message to complete the particular call through the public switched network in the manner specified by the subscriber's data file in the ISCP 25.

In an actual implementation of the present invention, the network of FIG. 1 would continue to offer a wide range of services using the standard call processing routines common today, including those outlined above. However, the present invention also facilitates customized routing through the network to servers or service bureaus of a large number of information providers, using one or two short codes. Herein, a short code is a number of fewer digits than is necessary to uniquely identify a destination station, e.g. fewer than seven digits for local calls. The preferred embodiment utilizes one or more N11 type codes.

The information service providers (ISPs) negotiate with their respective customers to determine how the customers prefer to route their calls. The providers establish and maintain appropriate CPRs for their customers in the providers' own databases 35 or 45, to achieve the desired routing functionality. As will be discussed more below, an N11 code can trigger use of different databases to control routing under different conditions, e.g. at different times of day. This effectively provides the different ISPs equal access to the short code trigger functionality.

In a call processing operation in accord with the present invention, a switch such as SSP switch 21 reaches a point in call (PIC) in processing a particular call which triggers AIN type processing. A variety of triggers are known including the full range of AIN triggers, virtual numbers (e.g. 500, 800, 900) etc. In response to the PIC trigger, the switch 21 launches a TCAP query through the STP 23 to the ISCP 25. The ISCP 25 accesses the relevant call processing record (CPR) for the subscriber. If the call originates from a line not associated with a customer who has previously subscribed to the N11 service, or if the caller dialed a casual access type N11 code, the network may route the call to the IP 21, prompt the caller and receive digits identifying a selected ISP. In accord with the present invention, the CPR retrieved in response to a query produced by the N11 trigger or the selection digits collected through the IP will identify one or more ISP databases, 35, 45, for N11 calls satisfying different predetermined criteria.

The ISCP 25 obtains call control or routing information that the switch 21 needs or processing information that other nodes (e.g. IP 29) need to process the call. If conditions relating to the present call conform to criteria for processing of the call by the TELCO, e.g. on a trigger relating to the Area Number Calling service offered by the TELCO, then the ISCP 25 retrieves a CPR from its own internal SCP database to determine how to process the call and provides an appropriate response message back to the switch 21 or to IP 29. If the call meets other criteria (e.g. an N11 call relating to a service offered by one of the ISPs), then the ISCP 25 communicates with a selected one of a plurality of separate routing databases 35, 45 through the SS7 network.

The selected database 35 or 45 contains a call processing record (CPR) for providing the subscriber a customized call processing service on the particular type of information service call. The subscriber has previously communicated to the ISP how calls should be processed, and personnel of the ISP company have established the appropriate CPR in the database 35 or 45.

The database 35 or 45 accesses the CPR to determine how to process the particular call and returns an appropriate instruction, in a TCAP response message, to the ISCP 25. The ISCP 25 performs a mediation function. Specifically, the ISCP 25 processes the instructions from the ISP database 35 or 45 to insure validity and compatibility with the processes of the elements of the TELCO network that will handle the call. Based on validated instructions, the ISCP 25 formulates an appropriate TCAP response message or instruction for the IP 21. The ISCP 25 transmits the TCAP messages through SS7 links and one or more STPs 23 to the switch 21, and the switch 21 processes the call accordingly. Alternatively, the ISCP 25 transmits instructions for the IP 21 through a second signaling network, and the IP 29 processes the call accordingly.

In this manner, a customer can obtain independent services from multiple providers using a single trigger and pre-established selection criteria stored in the ISCP. For casual information service calls and/or calls from non-subscribers, processing data stored in the providers database also controls processing and routing of the calls through the TELCO network. The present invention effectively provides multiple information service providers equal access to the AIN trigger functionalities at various points in call processing, to allow each carrier to independently offer customers special or customized services.

A more detailed discussion of the call processing flow of a specific example in accord with the invention is discussed below with regard to the flow chart shown in FIG. 2. For this example, it is assumed that two N11 type short codes are available, 211 and 511. In the example used here, the numbers are each a different N11 type three digit number. Other N11 numbers or other specific numbers of fewer or more digits could be used, so long as the system recognizes an initial dialing of those digits as a request to access an information service provider. One short code number (211) identifies a request for access using preprogrammed service selections. The second short code number (511) would then be used for casual calls by preprogrammed customers.

To initiate any call, a telephone user takes the telephone handset off hook and dials digits. The end office switching system, in this case an SSP 21, detects the off-hook condition on the caller's line (S1). The end office SSP 21 collects dialed digits (S2). The SSP end office examines the first three dialed digits to determine whether or not the customer has dialed one of the two dedicated information service access numbers, 211 or 511 (S3). If not processing branches to step S4, wherein the TELCO network executes its normal call processing routines. In a typical case this involves collecting seven or ten digits to identify a local or North American long distance call destination and completing the call to the dialed destination, using the call processing routines outlined earlier.

If the first three dialed digits were 211 or 511, then processing branches from step S3 to Step S5. The system processes the call as an information service call. At step S5, the originating SSP type central office (CO) 21 suspends the call and sends a query to the ISCP 25 via one or more STP's 23. This query message takes the form of a TCAP initial query from an SSP. The query message includes a variety of information relating to the particular call. Of particular note at this point, the query message includes the dialed digits, either in three digit form or padded to form a seven digit number. The TCAP query also includes the identification of the telephone line from which the party originated the present call. The SS7 protocol address portion of this first TCAP query message includes point code information relating to the sending point and the receiving point, that is the SSP 21 and the ISCP 25 at this point in the example. Later, when the ISCP sends back a response to the SSP 21, the ISCP will reverse the point codes to send the response back through the SS7 compliant CCIS network.

The ISCP determines if the dialed number in the TCAP message indicates that the caller initially dialed 211 or dialed 511 (S6). If the number dialed was 511, the system processes the call as a casual information service call, e.g. from a customer who now wishes to casually call an information service provider not included in preprogrammed selections for that customer. The call processing for such casual calls using 511 will be discussed in detail later, starting with the discussion of step S16.

If the number dialed was 211, the system processes the call as an information service call requesting processing using customer selection data programmed into the ISCP data base. Processing therefore branches from step S6 to step S7.

Not all callers who choose the 211 code will have previously subscribed to the information services of one or more of the ISPs. There are several ways to deal which such callers. One approach is to arbitrarily assign groups of unsubscribed customers to individual ISPs, in a manner similar to that sometimes used to assign telephone subscribers to long distance carriers. In such a case, the ISCP would proceed to query the DB 35 or 45 of the ISP to which the calling party's line had been assigned. In the present example, however, assume that such callers are to be given an option to select an ISP.

Figure 2:
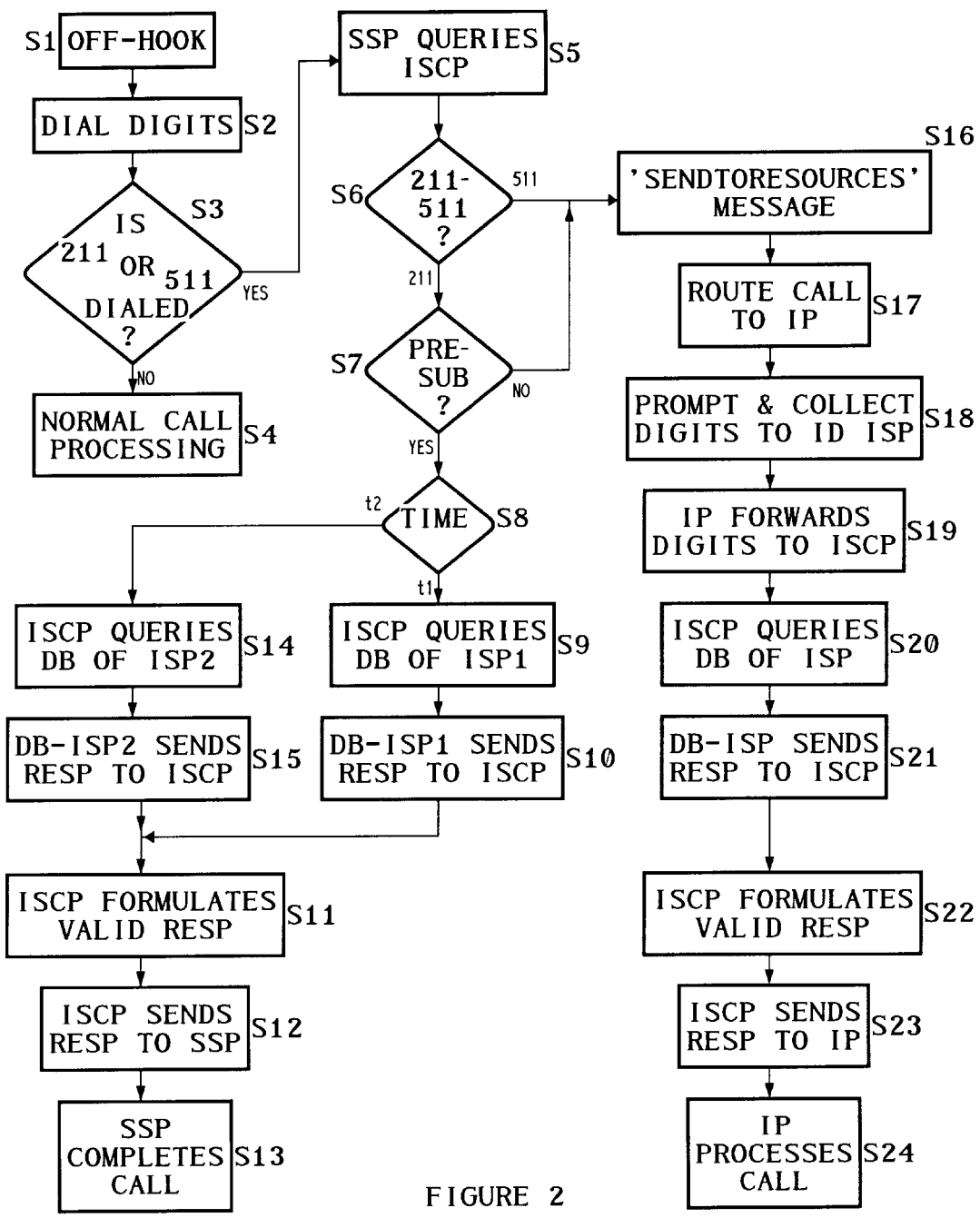
FIG. 2 is a simplified flow diagram of the call processing steps for routing N11 calls to selected information service providers systems, in accord with the present invention.

In the process shown in FIG. 2, the ISCP 25 next checks the identification of the telephone line from which the party originated the present call. If the line does not correspond to a customer who has previously subscribed to short code access to services of one or more of the ISPs, then a branch occurs from step S7 to step S16. In such a case, the system will process the call in substantially the same manner as for a casual information service call, starting at step S16, as will be discussed later.

If the calling party's line corresponds to a customer who has previously subscribed to a short code access type information service, call processing at step S7 results in a branch to step S8. The ISCP 25 accesses the pre-subscribed caller's data file or CPR in the internal SCP database. The caller's data file specifies predefined criteria for selection of an ISP. The criteria may specify a single, previously selected ISP. For purposes of this example, however, it is assumed that the data file indicates subscription to services of two ISPs and criteria under which calls relate to each ISP service. The criteria defined in the data file in the ISCP permits short code access to multiple ISPs in response to a single trigger detected on calls from a single telephone line.

The ISP selection criteria established in the caller's data file within the ISCP 21 may be any criteria the owner of the calling line may choose. In the illustrated example, the criteria is time based. The owner of the line has decided that short code ISP calls during time t1 (e.g. 8:00AM to 9:00PM) should go to ISP1 and short code ISP calls during time t2 (all other times) should go to ISP2. For example, ISP1 may offer a range of general information services, such as a newspaper service with various news categories. In such a case, the owner might permit his or her family and children to access this service, particularly during daytime hours. The second ISP, however, offers a different type of service that the owner wants available only after the children have gone to bed.

In the present example, the ISCP 21 utilizes the automatic number identification (ANI) of the calling party line, included in the TCAP query from switch 21, to access an appropriate call processing record (CPR). The record may be within its own internal SCP type database, or the ISCP may access a record in a separate database. The record indicates different procedures to be used at different times. The record therefore results in a branching based on time, at step S8. If the call occurs within time t1, the ISCP transmits a TCAP query message through SS7 data links and one or more STPs 23 to the database DB 35 of ISP1 (step S9).

The query message sent to the DB 35 is essentially the same as a TCAP query that originated from a switch. This query typically includes called and calling party numbers and other relevant information about the current call. The SS7 protocol address portion of this second query message includes point code information relating to the sending point and the receiving point, that is the ISCP 25 and the DB 35 in this example. The DB 35 contains a call processing record (CPR) for providing a customized service to each of the subscribers to services of ISP1. Each such subscriber has previously communicated to the ISP company how certain calls should be processed, and the ISP's personnel have established the appropriate CPR in the DB 35. The CPRs, for example may specify customized security procedures, preferred service selections with corresponding direct routing to the bureau component or server providing the selected service, etc.

Using the calling party information to identify the subscriber and the subscriber's record in the database, the DB 35 processes the query to generate a response containing an appropriate call processing instruction. The DB 35 reverses the point code information from the second SS7 query to send the response message back to the ISCP 25 through the appropriate data links and one or more of the STPs 23 (step S10).

As noted, the query from the ISCP 21 includes information needed by the DB 35 to access a record and formulate a response. In the present example, assume that the DB 35 uses the calling party line identification from the second query to access the customer's record to determine a routing number to a specified services bureau 31 offering a service previously selected by the subscriber.

The DB 35 formulates a TCAP response message, including the necessary routing number, and transmits that message back through the SS7 links and STP(s) to the ISCP 25 (step S10). The ISCP 25 processes the information from the DB 35 to insure compatibility thereof with the call processing capabilities of the switch 21, for example, to avoid supplying a routing number that would place the switch in a processing loop. Using the validated information, the ISCP 25 formulates a second TCAP response message (step S11) and sends that message to the SSP switch 21 via the SS7 links and one or more STPs 23 (S12). The SSP switch 21 utilizes the validated instruction (routing number in the present example) from the response from the ISCP 25 to process the call. In the present case, the switch 21 uses the routing number to complete the call (S13) to the services bureau 31.

Returning to the branching in step S8, if the call occurs within time t2, processing branches to step S14. In this case, the ISCP transmits the second TCAP query message through SS7 data links and one or more STPs 23 to the database DB 45 of ISP2 (step S14). Again, the query message contains various call related information, including the calling party's number. The SS7 protocol address portion of the message includes destination point code information relating to the sending point and the receiving point, that is the ISCP 25 and the DB 45 in this example.

The DB 45 contains a call processing record (CPR) for providing a customized service to each of the subscribers to services of ISP2. In this case, the subscriber also has previously communicated to the ISP company how certain calls to ISP 2 should be processed, and that ISP's personnel have established the appropriate CPR in the DB 45, in a manner similar to that for the ISP1 discussed above. The customized services provided by the ISP2 may be similar to or radically different from those offered by the ISP1, and the corresponding routing functionality may be similar or quite different.

Using the calling party information to identify the subscriber and the subscriber's record in the database, the DB 45 processes the query to generate a response containing an appropriate call processing instruction. The DB 45 reverses the point code information from the second SS7 query received in step S14 to send the response message back to the ISCP 25 through the appropriate data links and one or more of the STPs 23 (step S15).

As noted, the query from the ISCP 21 includes information needed by the DB 45 to access a record and formulate a response. In the present example, assume the ISP2 offers a range of services selectable by voice response interaction, and the calling party's CPR in DB 45 indicates a preference for this type of selection instead of direct routing to a selected server 41. The DB 45 uses the calling party line identification from the second query to identify the caller's pre-stated preference, and therefore retrieves a routing number corresponding to a direct inward dialing line through switch 40 to voice response unit (VRU) 49.

The DB 45 formulates a TCAP response message, including the necessary routing number for the VRU 49, and transmits that message back through the SS7 links and STP(s) 23 to the ISCP 25 (step S15). The ISCP 25 processes the information from the DB 45 to insure compatibility thereof with the call processing capabilities of the switch 21. Using the validated information, the ISCP 25 formulates a TCAP response message (step S11) and sends that message to the SSP switch 21 via the SS7 links and one or more STPs 23 (S12). The SSP switch 21 utilizes the validated instruction (routing number in the present example) from the response from the ISCP 25 to process the call.

In the present case, the switch 21 uses the routing number to route the call (S13) to the switch 40, and the switch 40 completes the call to the VRU 49. At this point, the VRU might play a spoken message type greeting, a menu of services and a voice prompt for a DTMF input of a service selection. In such a system, the VRU 49 would detect DTMF digits and in response thereto provide an instruction to the switch 40 to transfer the call to the server 41 providing the service selected by the calling customer.

As noted earlier, call processing may branch from step S6 to step S16 if the caller dialed 511, and call processing may branch from step S7 to step S16 if the caller dialed 211 but is not previously subscribed to services of any ISP. Processing from this point on is intended to provide the caller a menu prompt, collect digits identifying a selected ISP and then process the call per instructions from the database operated by the selected ISP.

In step S16, the ISCP 25 formulates a "SENDTORESOURCES" type TCAP message and sends that message back to the SSP 21 via one or more of the STPs 23 and the appropriate SS7 signalling links (S16). This message includes sufficient information to route the call to one of the lines going to IP 29. The SSP 21 uses the information in "SENDTORESOURCES" message to route the call to the IP 29 (S17). More specifically, if the IP 29 connects directly to the SSP 21, then the SSP simply activates appropriate internal switching elements to establish the call connection channel between the caller and the IP 29. If the IP 29 does not connect to the particular SSP 21, the instruction will provide sufficient information to route the call through other switching systems to the IP 29.

When the IP 29 receives the call, the SSP 21 provides the IP with a substantial amount of information about the particular call, including the dialed digits and the calling party's telephone number. In response to the call, the IP 29 formulates a query message containing this information. The IP will transmit this query message to the ISCP 25 via the second signalling communication network. The ISCP 25 utilizes the information from the IP query message to access the stored data tables in its internal SCP database, formulate an appropriate instruction and transmit that instruction back to the IP via the second signalling communication network. In the present short code access to information services call, the ISCP 21 instructs the IP 29 to play a specified voice message and collect digits (S18).

The message from the IP 29 will typically identify the ISPs available through the system and may provide a brief explanation of the types of services each ISP offers. The message will then prompt the caller to input selection digits. The IP 29 forwards the collected digits to the ISCP 21 through the second signaling network (S19).

The ISCP transmits a second TCAP query message through SS7 data links and one or more STPs 23 to the database DB 35 or 45 of identified ISP (step S20). Again, the second query message contains various call related information, including the calling party's number. The SS7 protocol address portion of the second query message includes destination point code information relating to the sending point and the receiving point, that is the ISCP 25 and the DB 35 or 45 of the selected ISP.

Recall that the processing has reached this stage because the caller has used the casual access number or has dialed 211 but is not pre-subscribed to services of an identified ISP. The DB queried at this stage can recognize this status from the dialed digits (211 or 511) alone or in combination with the calling party's line identification number included in the second TCAP query message. If the dialed digits are 511, then the call is to be treated as a casual access call. If the dialed digits are 211 and the calling party number is not that of an established subscriber, then the call is to be treated as a call from a new customer. In either case, such calls typically are routed to a generic greeting and/or menu type message, in the services bureau 31 or on the VRU 49, depending on the ISP the caller selected. Alternatively, if a provider such as ISP1 does not maintain such a message in the services bureau 31, that ISP could contract with the TELCO to provide the greeting and collect selection digits via the IP 29 before routing to the ISP's equipment. In this later case, the DB would provide additional instructions to play the message and collect more digits. This process may continue through several cycles until the user selects a service and the DB returns a destination number corresponding to the selected service.

For simplicity of further discussion, assume that the caller selected ISP2, and ISP2 maintains the generic greeting message and digit collection functionality in the VRU 49. The DB 45 processes the query to generate a response containing an appropriate call processing instruction, in this case including a number for routing calls to the VRU 49 and triggering the generic greeting. The DB 45 reverses the point code information from the SS7 query to send the response message back to the ISCP 25 through the appropriate data links and one or more of the STPs 23 (step S21).

The ISCP 25 processes the information from the DB 45 to insure compatibility thereof with the call processing capabilities of the IP 29. Using the validated information, the ISCP 25 formulates a response message (S22) and sends that message to the IP 29 via the second signaling network (S23). The IP 29 utilizes the validated instruction to process the call (S24). As noted, the IP may play another announcement and collect further digits, for example if a selected ISP (such as ISP1) did not offer the menu function on its own system. In such a case, steps such as S18–S24 would repeat one or more times until the DB provides a routing number identifying a destination for the information service call. In the present example, however, it was assumed that the DB 45 returned a routing number corresponding to the VRU 49.

When the IP receives a routing number, the IP provides an instruction to the connected switching office 21 to transfer the call through the network to the identified destination number. In the present example of caller selection of ISP2, the number corresponds to the VRU 49. The IP 29 therefore instructs the switch 21 to transfer the call through the switch 40 to the VRU 49. At this point, the VRU might again play a spoken message type greeting, menu of services and prompt for a DTMF input service selection. The VRU 49 detects DTMF digits and in response thereto provides an instruction to the switch 40 to transfer the call to the server 41 providing the service selected by the calling customer.

While this invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

We claim:

1. A method comprising the steps of:

detecting dialing from a calling communication station of a predetermined short code number prior to dialing of any other digits at the start of a call at one of a plurality of switching offices of a communication network;

sending a first query containing information relating to the call through an interoffice signaling network to a mediation point;

based on predetermined criteria, selecting one of a plurality of information service providers capable of providing an independent information service to the calling communication station and sending a second query containing at least some of the information relating to the call to a database of the selected information service provider via the interoffice signaling network;

accessing data in the database of the selected information service provider in response to the second query to obtain a call processing instruction;

sending a first response containing the call processing instruction from the database of the selected information service provider to the mediation point via the interoffice signaling network;

processing the first response to validate the call processing instruction;

sending a second response containing the validated call processing instruction to a call processing node of the communication network; and processing the call in the communication network in accord with the validated call processing instruction.

2. A method as in claim 1, wherein the switching offices are telephone central office switching systems, and the interoffice signaling network is a common channel interoffice signaling system of a telephone network.

3. A method as in claim 1, wherein the step of processing the call comprises routing the call to a server or a services bureau operated by the selected information service provider to provide a caller with information therefrom.

4. A method as in claim 1, wherein the predetermined criteria identifies one preselected information service provider.

5. A method as in claim 1, wherein the predetermined criteria identifies one of a plurality of preselected information service providers based on a preestablished condition relating to the call.

6. A method as in claim 5, wherein the preestablished condition relates to time of occurrence of the call.

7. A method as in claim 1, wherein the predetermined criteria relates to input of a selection after dialing of the predetermined short code.

8. A method as in claim 1, wherein the step of processing the call comprises routing the call to a services bureau or a server operated by the selected information service provider in accord with routing information from the database of the selected information service provider.

9. A method as in claim 1, wherein the predetermined short code number consists of an N11 number.

10. A method as in claim 1, wherein the step of selecting one of a plurality of information service providers comprises accessing a record associated with the calling communication station stored in the mediation point.

11. A method as in claim 10, wherein:

the accessed record identifies at least two of the information providers and predetermined call related selection criteria; and the step of selecting one of a plurality of information service providers further comprises analyzing the information relating to the call to determine which of the predetermined call related criteria are satisfied.

12. A method as in claim 11, wherein the step of processing the call comprises routing the call from the one switching office to equipment operated by the selected information service provider.

13. A method as in claim 10, wherein the step of selecting one of a plurality of information service providers comprises:

playing an announcement to a caller; and collecting digits from the caller indicating a selection of one of the information service providers.

14. A method as in claim 13, wherein the step of playing the announcement to a caller comprises:

sending an instruction to the one switching office;

routing the call through the communication network to an intelligent peripheral in response to the instruction to the one switching office; and playing a predetermined voice announcement stored in the intelligent peripheral.

15. A method as in claim 14, wherein the step of collecting digits from the caller comprises collecting digits in the intelligent peripheral and forwarding the digits collected in the intelligent peripheral to the mediation point.

16. A method as in claim 14, wherein the step of collecting digits from the caller comprises collecting digits in the intelligent peripheral and forwarding the digits collected in the intelligent peripheral to the mediation point through a signaling network separate from the interoffice signaling network.

17. A method as in claim 14, wherein the step of processing the call comprises transferring the call from the intelligent peripheral to equipment operated by the selected information service provider.

18. A system, comprising:

a network, said network comprising:

(A) local communication links, (B) a plurality of separately located central office switching systems interconnected via trunk circuits for selectively providing switched call connections between at least two of the local communication links, (C) a mediation point, separate from the central office switching systems, and (D) a signalling communication system for two-way communications of data messages, said signalling communication system interconnecting the central office switching systems and connecting the central office switching systems to the mediation point;

first and second information service provider systems connected to at least one central office switching system of the network for providing selected information via communication through the network; and first and second service control databases coupled for communication with the mediation point via the signaling communication system, said first service control database containing control data related to services of the first information service provider system and said second service control database containing data related to services of the second information service provider system, wherein:

the central office switching systems transmit query messages to the mediation point via the signaling network in response to receipt of a predetermined short code number from a calling communication station prior to dialing of any other digits; and in response to each query relating to receipt of the predetermined short code, the mediation point selects one of the first service control database and the second service control database depending on whether a parameter relating to the particular call meets a first predetermined criteria or a second predetermined criteria respectively, the mediation point obtains and validates call processing control information from the selected service control database, and the mediation point transmits validated call processing control information to a node of the network to control processing of a call.

19. A system as in claim 18, wherein the mediation point comprises an integrated services control point.

20. A system as in claim 18, wherein the central office switching systems are telephone central office switches, and the interoffice signaling network is a common channel interoffice signaling network of a telephone network.

21. A system as in claim 20, wherein the local communication links are telephone communication links.

22. A system as in claim 21, wherein the telephone communication links are telephone lines.

23. A system as in claim 18, wherein at least one of the first and second information service provider systems comprises an information services bureau.

24. A system as in claim 18, wherein at least one of the first and second information service provider systems comprises a plurality of information servers.

25. A system as in claim 24, wherein said at least one of the first and second information service provider systems further comprises a switch selectively coupling the plurality of information servers to one of the central office switching systems.

26. A system as in claim 25, wherein said at least one of the first and second information service provider systems further comprises voice response unit coupled to the switch for providing speech messages and receiving input information from users during calls.

27. A system as in claim 18, wherein the network further comprises an intelligent peripheral coupled by a communication line to one of the central office switching system and coupled for data communication with the mediation point via a signaling system separate from the interoffice signaling system.

28. In a system comprising:

(A) local communication links, (B) a plurality of separately located central office switching systems interconnected via trunk circuits for selectively providing switched call connections between at least two of the local communication links, (C) a mediation point, separate from the central office switching systems, (D) a signalling communication system for two-way communications of data messages, said signalling communication system interconnecting the central office switching systems and connecting the central office switching systems to the mediation point, (E) first and second information service provider systems connected to at least one of the central office switching systems for providing selected information, and (F) first and second service control databases coupled for communication with the mediation point via the signaling communication system, said first control database containing control data related to services of the first information service provider system and said second control database containing data related to services of the second information service provider system, the method of routing a call to a selected one of the first and second information service provider systems comprising the steps of:

at one central office switching system, detecting input digits of a predetermined short code number on one of the connected local communication lines prior to input of any other digits at the start of a call;

sending a first query containing information relating to the call from the one central office switching system through the signaling communication system to the mediation point;

selecting one of the first and second service control databases based at least in part on the information relating to the call;

sending a second query containing the information relating to the call from the mediation point to the selected service control database through the signaling communication system;

in response to the second query, accessing control information stored in the selected service control database;

sending a first response from the selected service control database to the mediation point through the signaling communication system, said first response including the control information;

validating the control information included in the first response;

sending a second response from the mediation point to the one central office switching system through the signaling communication system, said second response including validated control information; and processing the call in response to the validated control information.

29. A method as in claim 28, wherein the step of processing the call in response to the validated control information comprises routing the call from the one central office switching system to one of the first and second information service provider systems.

30. In a system comprising:

(A) local communication links, (B) a plurality of separately located central office switching systems interconnected via trunk circuits for selectively providing switched call connections between at least two of the local communication links, (C) a mediation point, separate from the central office switching systems, (D) a signalling communication system for two-way communications of data messages, said signalling communication system interconnecting the central office switching systems and connecting the central office switching systems to the mediation point, (E) first and second information service provider systems connected to at least one of the central office switching systems for providing selected information, and (F) first and second service control databases coupled for communication with the mediation point via the signaling communication system, said first control database containing control data related to services of the first information service provider system and said second control database containing data related to services of the second information service provider system, the method of routing a call to a selected one of the first and second information service provider's systems comprising the steps of:

at one central office switching system, detecting input digits of a short code number on one of the connected local communication lines prior to input of any other digits at the start of a call;

sending a first query containing information relating to the call from the one central office switching system through the signaling communication system to the mediation point;

if the information relating to the call satisfies a first predetermined condition, then selecting one of the first and second service control databases based on information stored in the mediation point;

if the information relating to the call satisfies a second predetermined condition, then prompting a calling party to input a selection and selecting one of the first and second service control databases in response to the input selection;

sending a second query containing information relating to the call from the mediation point to the selected service control database through the signaling communication system;

in response to the second query, accessing control information stored in the selected service control database;

sending a first response from the selected service control database to the mediation point through the signaling communication system, said first response including the control information;

validating the control information included in the first response; and processing the call in response to the validated control information.

31. A method as in claim 30, wherein the step of prompting a calling party to input a selection and selecting one of the first and second service control databases in response to the input selection comprises:

instructing the one central office switching system to route the call to an intelligent peripheral;

playing an announcement to the calling party;

receiving the input selection from the calling party; and sending the input selection from the intelligent peripheral to the mediation point.

32. A method as in claim 31, wherein the step of processing the call in response to the validated control information comprises:

formulating a second response containing the validated control information;

sending the second response to the intelligent peripheral; and executing a function of the intelligent peripheral in response to the second response.

33. A method as in claim 32, wherein the step of executing a function of the intelligent peripheral in response to the second response comprises transferring the call to one of the first and second information service provider systems.

34. A method as in claim 30, wherein the validated control information includes a full directory number assigned to a communication link from one of the central office switching systems to the one of the first and second information service provider systems.

35. A method as in claim 30, wherein the first predetermined condition is that the information relating to the call identifies a party having a pre-established selection of an information service provider stored in the mediation point.

36. A method as in claim 35, wherein the second predetermined condition is that the information relating to the call identifies a party not having a pre-established selection of an information service provider stored in the mediation point.

37. A method as in claim 30, wherein the first predetermined condition is that the input digits of the short code number equals a first predetermined value.

38. A method as in claim 37, wherein the second predetermined condition is that the input digits of the short code number equals a second predetermined value different from the first predetermined value.

* * * * *